Sept. 15, 1970      V. DUQUESNE      3,528,475
APPARATUS FOR FITTING ON AND REMOVING AUTOMOBILE TYRES
Filed Nov. 15, 1966      4 Sheets-Sheet 1

INVENTOR
VICTOR DUQUESNE
By Linton and Linton
ATTORNEYS

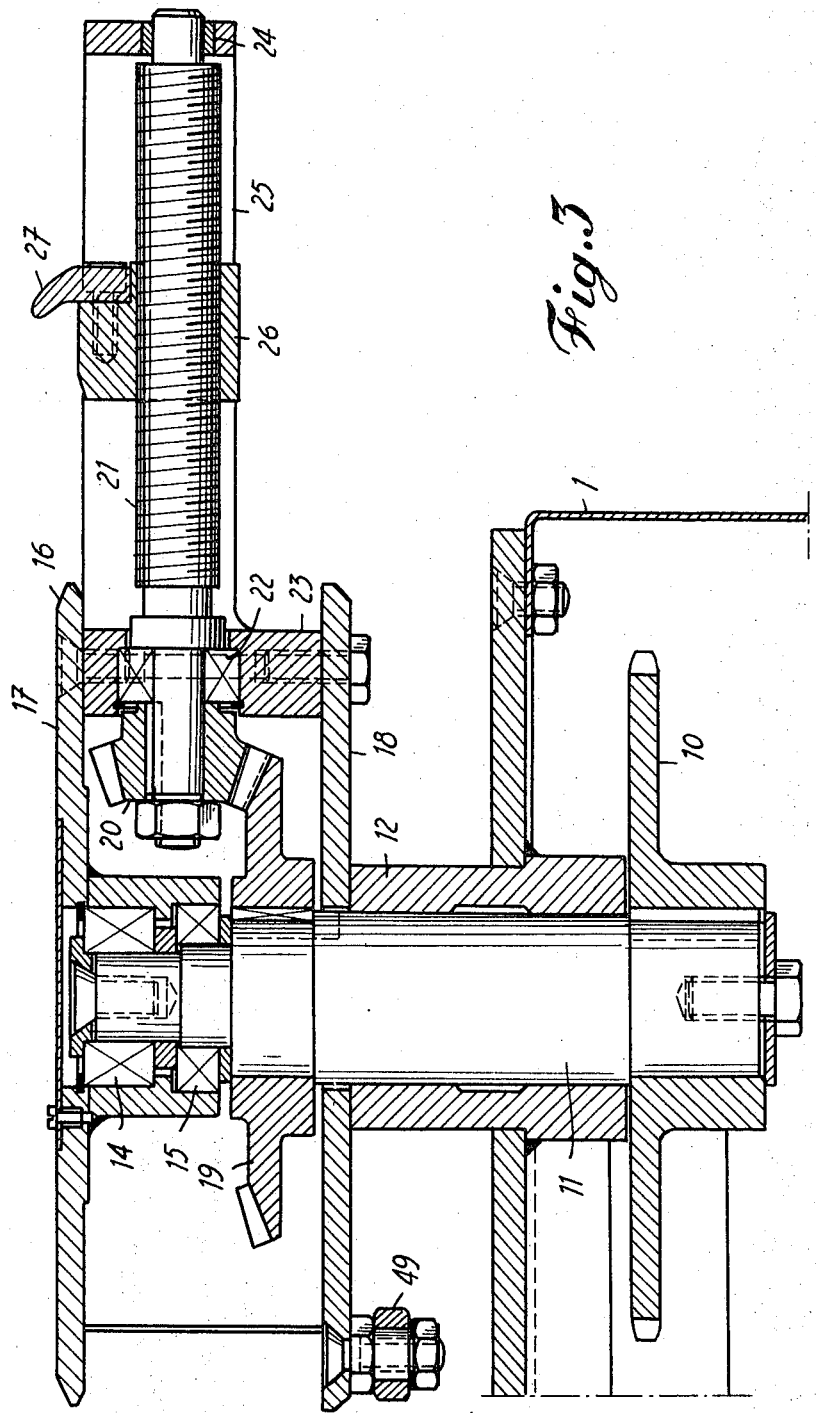

United States Patent Office 3,528,475
Patented Sept. 15, 1970

3,528,475
APPARATUS FOR FITTING ON AND REMOVING AUTOMOBILE TYRES
Victor Duquesne, 42–44 Quellinstr. Antwerp, Belgium
Filed Nov. 15, 1966, Ser. No. 594,470
Claims priority, application Belgium, Nov. 26, 1965, 672,886; Nov. 3, 1966, 46,186
Int. Cl. B60c 25/10
U.S. Cl. 157—1.24                               6 Claims

ABSTRACT OF THE DISCLOSURE

The present apparatus is for automatically fitting on and removing tyres from all types of automobile wheels by laying a wheel horizontally on a driven table which can rotate and by operating a pedal the wheel is clamped or unclamped thereon. The pedal is then released and a tyre laid in a slanting position on the wheel and means guides and presses the bead of the tyre over the edge of the tyre rim for mounting purposes or a lever having an inverted conical rotary end is thrust between the wheel rim and the wheel of the tyre for removing the tyre from the wheel.

---

The present invention concerns a fully automatic apparatus for fitting on and removing automobile tyres.

The main advantage of this apparatus consists in the fact that it is enough to operate a single pedal both for clamping and unclamping the wheel and for causing the latter to rotate in both directions with respect to the fitting and removing means.

A further considerable advantage of the apparatus in question is that the fitting and removal gears require only one single adjustment for making them fit to be used with any kind of wheel whatever, and that said fitting and removal means which come into contact with the tyre consist of rotary elements.

With this object in view, the apparatus according to the present invention substantially consists in the following combination: a table onto which the wheel in question is laid horizontally; a driving shaft onto which the table can freely rotate; a plurality of guiding arms mounted radially around the table; a driving device for moving aforesaid shaft in both directions; on each of the guiding arms, a claw which is movable along the length of the arm, which claws are collectively able to grip the rim of the wheel; a device mounted between said driving shaft and the claws for the radial displacement of the latter and rotation of the table; an arm mounted in order to be able to swing in a horizontal plane on top of aforesaid table; a vertical rod with height adjustment, mounted on the free end of said swinging arm; a device for fastening said rod in the swinging arm; at least one guiding roller for guiding the bead or beads of the tyre slightly beyond the edge of the rim, which roller is mounted so as to be able to rotate freely about a vertical axis mounted onto the end of aforesaid rod; a pressure roller for pressing the beads of the tyre over the edge of the rim, mounted so as to be able to rotate freely about a horizontal axis fastened to the rod with height adjustment; a guiding roller which presses against the periphery of the rim and rotates about a vertical axis also mounted on the rod with height adjustment; a hook mounted onto aforesaid rod; a lever with free rotary end inversely conical for the removal of a tyre, which end is thrust between the rim of the wheel and the bead of the tyre whilst the lever is hooked in aforesaid hook; a clamping device for holding the table, mounted between the latter and the swinging arm which, in its stretched position, engages the holding device, and a cabinet or frame for the whole aforementioned gear.

By way of example and without implying any restrictive features, a detailed description is given hereafter of a possible but in no way exclusive form of embodiment of the apparatus according to the present invention. This description refers to the appended drawings of which:

FIG. 3 illustrates, on an enlarged scale, a section by a plane the trace of which follows the straight line III—III of FIG. 2;

Figure 1:
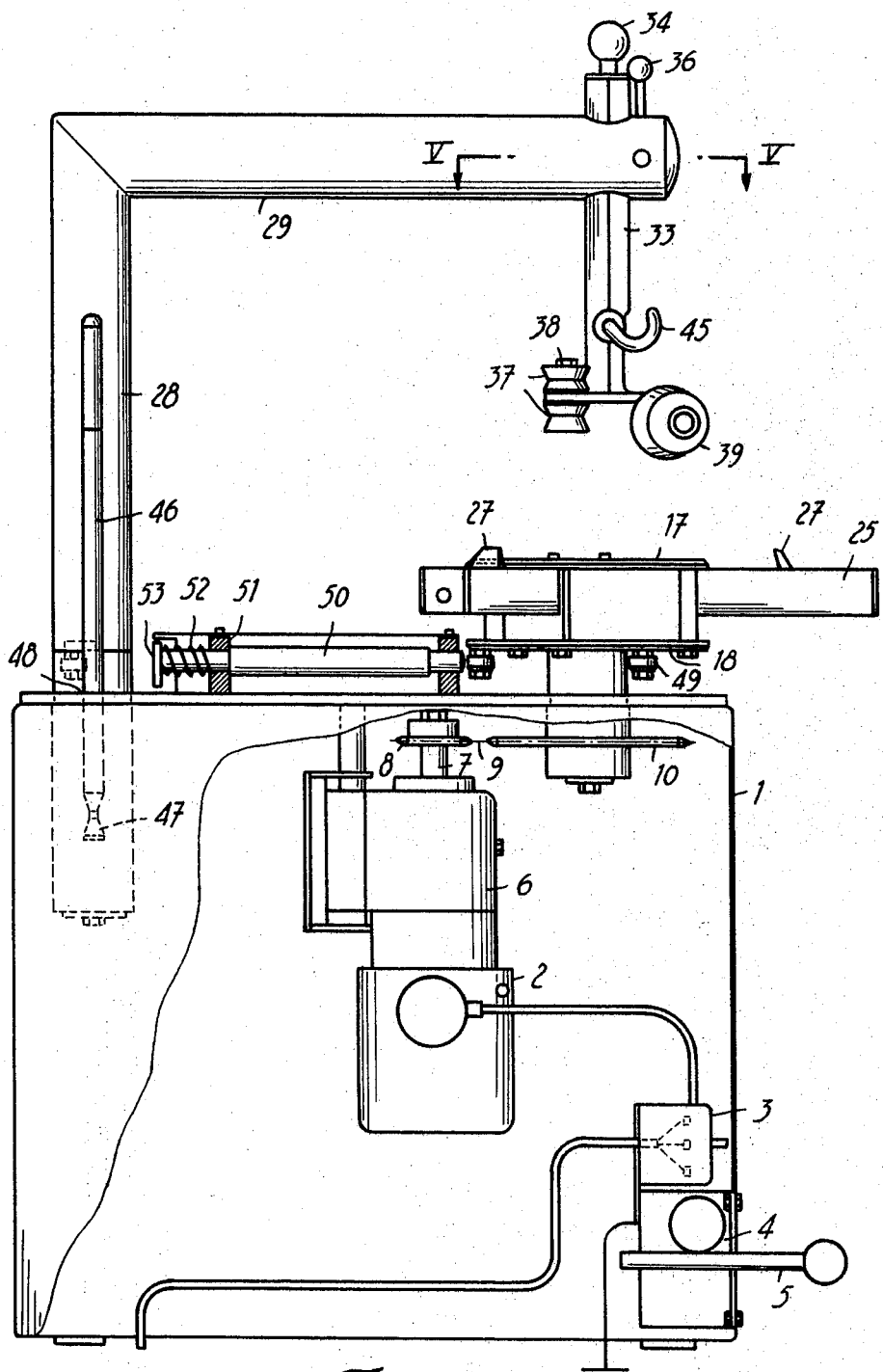
FIG. 1 is an exploded front view of the apparatus in question.
Figure 2:
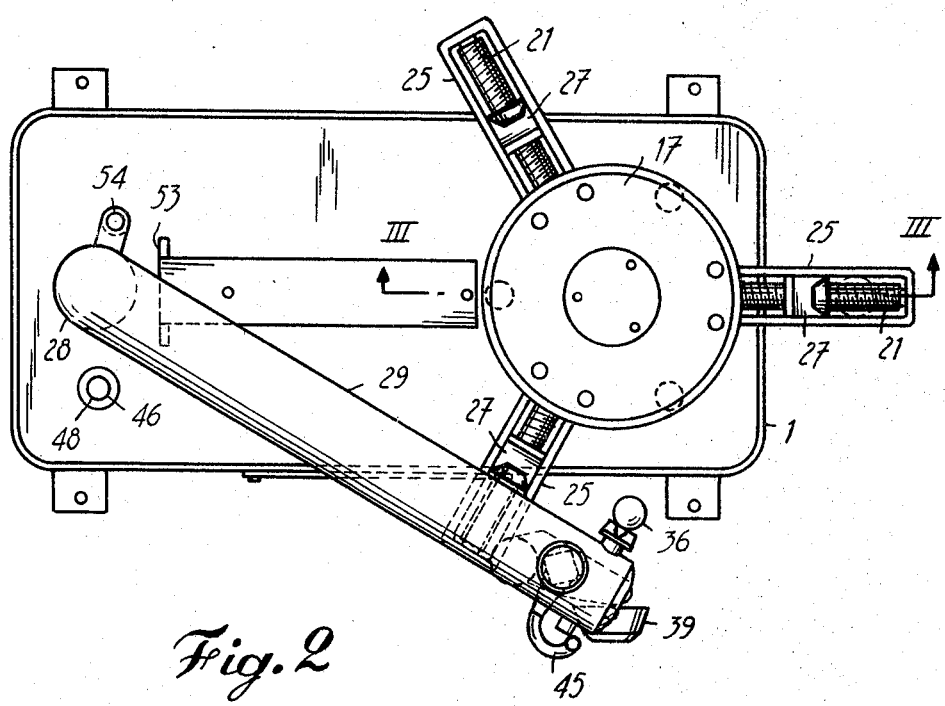
FIG. 2 is a top view of same.
Figure 4:
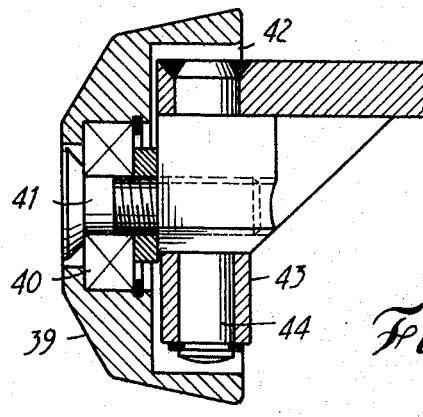
FIG. 4 illustrates, on an enlarged scale, a cross-section through the pressure roller.
Figure 5:
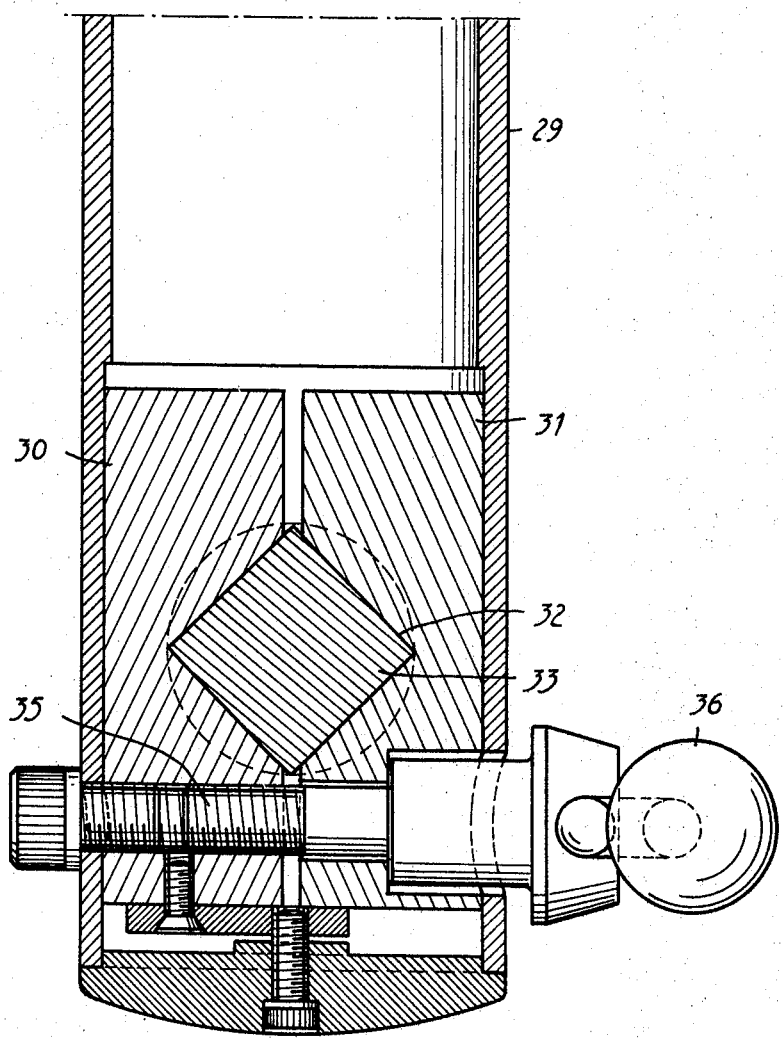
FIG. 5 illustrates, on an enlarged scale, a cross-section by a plane the trace of which follows the straight line V—V of FIG. 1.

The apparatus according to the present invention comprises a cabinet 1 containing an electric motor which can rotate in both directions. This motor is controlled by a circuit breaker 3 and a reversing switch 4 which can be put into the required position by means of a pedal 5. The motor drives a reduction gear 6 of which the drive shaft 7 carries a sprocket wheel 8 which, in turn, drives over a hinged chain 9 the sprocket wheel 10 mounted onto shaft 11. The latter passes through the top of cabinet 1 and rotates in a sleeve 12 fastened to the top plane of the cabinet 1. Around aforesaid shaft 11 is mounted, by means of two ball bearings 14–15, a rotary table 16 consisting of two discs 17–18. Between these discs, there is an angle pinion 19 which is mounted onto shaft 11 and engages three other angle pinions 20. Each one of the latter is fastened onto a guiding screw 21 which, on the one hand, turns in a ball bearing 22 mounted in a block 23 fastened between the two discs 17–18 of table 16, and rotates, on the one hand, in a bearing 24 located at the end of an open arm 25 which is part of block 23. The three arms in question are mounted radially. Onto each guiding screw 21 a small block 26 is screwed, which can move thereon in a to-and-fro motion and onto which is fastened a claw 27. These claws are able to grip the rim of the wheel which is being worked on, and to hold the latter fast onto table 16. In cabinet 1, there is a column 28 which can rotate. The top of this column carries a horizontal arm 29 onto which are mounted at the front two half-parts 30–31; this arm is traversed by an opening 32 with square cross-section into which a rod 33 of identical cross-section can be moved up and down and can be fastened. In order to make it easier to move said rod, the latter is provided on top with a handle 34. Arm 29, as well as both half-parts 30–31, are traversed by a cross-opening into which moves a threaded rod 35 which carries a crank 36. This threaded rod, provided with a shoulder, bears in the half-part 31 and screws into the threaded hole of half-part 30 which holds sliding rod 33. The latter carries at the bottom two guiding rollers 37 which can turn about a vertical axis 38 and of which the annular face has a V-shape. These guiding rollers guide the heads of the tyre, during fit-on of the latter, slightly beyond the edge of the rim. At the bottom of rod 33, there is also a pressure roller 39 mounted on a ball bearing 40 about a horizontal axis 41 which is carried by the end of said rod. Pressure roller 39 applies a pressure on the rim of the tyre in order to cause the bead of the latter to pass over the rim when the tyre is being fitted onto the wheel. In the recess 42 of pressure roller 39, there is a guiding roller 43 turning about a vertical axis 44 mounted on the end of rod 33. The object of this guiding roller is, when a tyre is being mounted, to run along the rim of the wheel and hence to determine the exact position of the guiding rollers 37 with respect to the peripheral edge of the wheel. Rod 33 is also provided with a hook 45 in which a lever 46 can freely be hooked, which lever carries at one end an inverted conical roller 47 which is thrust into the bead or beads of the tyre when removing the latter. When the apparatus is out of action, lever 46 is simply introduced into opening 48 of cabinet 1. The rotary motion of column 28, as well as the sliding vertical motion of rod 33 make that the guiding rollers 37 and 43, as well as the pressure roller 39 and the hook 45 can be set into the required position for fitting on or removing the tyre, and this according to the size of the wheel. A clamping mechanism works together with table 16 for preventing the latter from rotating when a wheel is being removed therefrom and pedal 5 is released for controlling the claws 27. With this object in view, three little thrust blocks 49 are mounted under disc 18, which blocks act together with a stop rod 50 led in a guide 51 and held in a retracted position by a thrust spring 52 mounted onto the rod and located between a thrust plate 53 of aforesaid rod and aforesaid guide 51. Column 28 carries at the bottom a stop 54 which, when column 28 is retracted to a maximum, exerts a pressure onto the thrust plate 53, which causes the top rod 50 to come into the path of the little thrust blocks 49, so that when the claws 27 are moved, table 16 can in no way start turning.

For fitting on a tyre, the wheel to be fitted is placed horizontally onto disc 17 of table 16 and pedal 5 is depressed. This causes the circuit of electric motor 2 to be closed so that the motor is set going, with the result that, by means of gearbox 6, the sprocket wheels 8 and 10, as well as hinged chain 9, shaft 11 which carries the angle pinion 19 begins to turn. It follows therefrom that the three angle pinions 20 which engage aforesaid angle pinion 19, guide the guiding screws 21, which causes the blocks 26 with the claws 27 to move towards the rim until the latter is strongly held between the set of claws 27. Pedal 5 is then released, which cuts off the electric circuit of motor 2 and brings the apparatus to a standstill. The tyre to be fitted on is then laid slanting on the wheel and arm 29 with the sliding rod 33 is moved towards the rim. Crank 36 is turned in such a way that the sliding rod 33 is released and can be displaced vertically until the lower guiding roller 37 rests on the rim whilst guiding roller 43 bears radially against the circumference of the latter. The tyre is placed in such a way that the pressure roller 39 pushes against the flange of the tyre and that the heels of the latter are guided by the guiding roller 37. Thereupon, pedal 5 is once more depressed, which again starts the motor and causes shaft 11 to rotate as described above. Due to the fact that the claws 27 grip the rim, the guiding screws 21 and the angle pinions 20 can no longer turn, so that the driven angle pinion 19 exerts onto the motionless pinions 20 such a pressure that they are moved along and that table 16 starts turning. In this way, the tyre is compelled to roll along its entire periphery under pressure roller 39 and is thus completely mounted onto the wheel. After this has happened, pedal 5 is released, which brings the device to a standstill. Column 28 is then caused to turn together with the sliding rod 33 so that the stop 54 exerts a pressure onto pressure plate 53 which, by means of the stop rod 50 and the thrust blocks 49, prevents the rotation of table 16. The pedal is now lifted, with the result that the throw-over switch 4 causes the motor and hence guiding screws 21 to rotate in the opposite direction, so that the claws 27 leave go of the rim.

For removing a tyre, the wheel is laid onto table 16 and fastened thereon by means of the claws 27, as described above. The conical roller 47 of lever 46 is then thrust under the bead or beads of the tyre and column 28 is turned until said lever 46 can be hooked into hook 45 on top of the wheel. Pedal 5 is then depressed in order that, as described above, the wheel should start rotating with the tyre, with the result that the bead or beads of the tyre are unrolled by the motionless lever over the rim. If then column 28 is rotated as described above, by lifting pedal 5, the claws 27 will release the wheel, as mentioned above, so that the latter can be removed.

It is evident that the shape, the dimensions and the relative positions of the parts described above may be different from the description which has been given, provided that the scope of the present invention is not exceeded, and that some of the parts described above can also be replaced by others which are capable of fulfilling the same functions.

I claim:
1. An apparatus for fitting on and removing the tyres of automobile vehicles, which apparatus mainly comprises: a table onto which the wheel in question is laid horizontally; a driving shaft about which aforesaid wheel can freely turn; a plurality of guiding arms mounted radially around the table; a driving device for moving aforesaid shaft in both directions; on each of the guiding arms, a claw which is movable along the length of said arm, which claws are collectively able to grip the rim of the wheel; a device mounted between said driving shaft and the claws, for radial displacement of the latter and rotation of the table; an arm mounted in order to be able to swing in a horizontal plane on top of aforesaid table; a vertical rod with height adjustment, mounted on the free end of said swinging arm; a device for fastening said rod in the swinging arm; at least one guiding roller for guiding the bead or beads of the tyre, able to turn freely on a vertical axis mounted at the end of aforesaid rod; a pressure roller for pressing the beads of the tyre over the edge of the rim, mointed so as to be able to rotate freely on a horizontal axis fastened to the rod with height adjustment; a guiding roller which presses against the periphery of the rim and rotates on a vertical axis which is also mounted on the rod with height adjustment; a hook mounted onto aforesaid rod; a lever with inversed conical rotary end for removal of a tyre, whereby the end in question is thrust between the rim and the heel of the tyre whilst the lever is hooked in aforesaid hook; a clamping device for holding the table, mounted between the latter and the swinging arm which, in its utmost extended position, engages the holding device, and a cabinet or frame for supporting the devices described above.

2. An apparatus as defined in claim 1, comprising: a drive shaft; a table which is mounted onto said shaft in such a way that it is free to rotate; an angle pinion solidly fastened onto said shaft; several angle pinions engaging the angle pinion in question; several guiding screws mounted radially in a horizontal plane around aforesaid table, whereby each one carries one of said angle pinions; for each guiding screw a supporting arm fastened to aforesaid table; and on each guiding screw a little block provided with a screw thread which carries a claw, whereby the whole set of claws grips together the rim of the wheel.

3. An apparatus as defined in claim 1, comprising a swinging arm with a vertical and a horizontal part, whereby said vertical part is mounted in the cabinet of the apparatus in such way as to be able to rotate freely, whilst the horizontal part carries a rod which can be moved up and down and means for fastening it.

4. An apparatus as defined in claim 1, comprising: sliding rollers for guiding the beads of the tyre; an axis for said guiding rollers; and a flat part onto which is mounted aforesaid axis and which is mounted at the bottom of the rod which can be adjusted up and down.

5. An apparatus as defined in claim 1, comprising a pressure roller for causing the beads of the tyre to pass over the rim of the wheel, whereby the rim of the little roller has a conical shape.

6. An apparatus as defined in claim 1, comprising: a pressure roller; a recess at the back of the latter; a guiding roller fitted in aforesaid recess about a vertical axis, which roller runs along the peripheral edge of the wheel rim, whereby said guiding roller projects slightly beyond the rear face of the pressure roller.

References Cited

UNITED STATES PATENTS

| | | | |
|---|---|---|---|
| 1,416,094 | 5/1922 | Krauska | 157—1.22 |
| 2,257,898 | 10/1941 | Breth | 144—288.1 |
| 3,104,695 | 9/1963 | McKinney | 157—1.22 |
| 3,238,989 | 3/1966 | Silvestrani | 157—1.24 |

TRAVIS S. McGEHEE, Primary Examiner